United States Patent [19]

Bossetti

[11] 4,227,847
[45] Oct. 14, 1980

[54] APPARATUS FOR LOADING OVENS FOR THE PRODUCTION OF TILES

[75] Inventor: Renato Bossetti, Novara, Italy

[73] Assignee: Societá Impianti Termoelettrici Industriali (s.a.s.), Marano Ticino, Italy

[21] Appl. No.: 929,293

[22] Filed: Jul. 28, 1978

[30] Foreign Application Priority Data

Jul. 28, 1977 [IT] Italy .................. 26235 A/77

[51] Int. Cl.³ .................. F27B 9/02; B65G 47/54
[52] U.S. Cl. ..................... 414/152; 198/427; 198/429
[58] Field of Search ............... 414/152, 156, 157, 159, 414/173; 198/426, 427, 429, 436, 485

[56] References Cited

U.S. PATENT DOCUMENTS

| 2,197,156 | 4/1940 | Ott | 198/426 |
| 2,252,937 | 8/1941 | Link et al. | 198/426 |
| 3,978,970 | 9/1976 | Reimers | 198/429 X |
| 4,039,072 | 8/1977 | Keller et al. | 198/436 X |

Primary Examiner—Robert G. Sheridan
Attorney, Agent, or Firm—Wenderoth, Lind & Ponack

[57] ABSTRACT

An apparatus for loading tiles into firing ovens comprises, in combination with each firing oven chamber, a device for feeding the tiles, means for forming on such device a file of tiles which must be loaded concurrently, and means for taking up from such device the tile file and forwarding it in the direction of the oven and transferring the tiles onto a terminal conveyor which conveys the tiles to the oven inlet. Preferably the tile take-up means are constituted by a support device which vertically displaceable between a lowermost and an uppermost position and adapted to lift up the tiles as it passes from the first to the second positions. Preferably also the tiles are forwarded in the direction of the oven by a thruster actuatable by suitable means in the desired direction and adapted to engage and to forward the tile file which has formed on the feeding device. An auxiliary static support organ is preferably provided to support the tiles in an intermediate phase of the forward progress.

5 Claims, 4 Drawing Figures

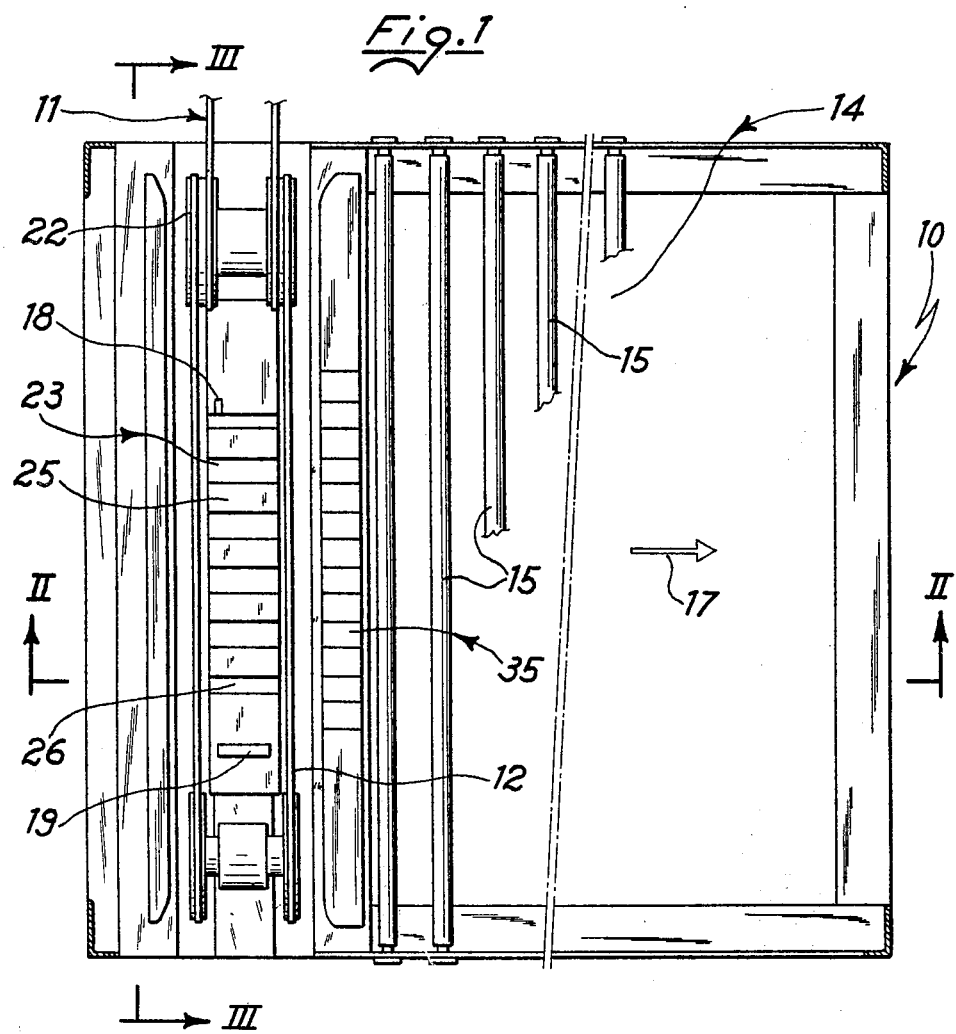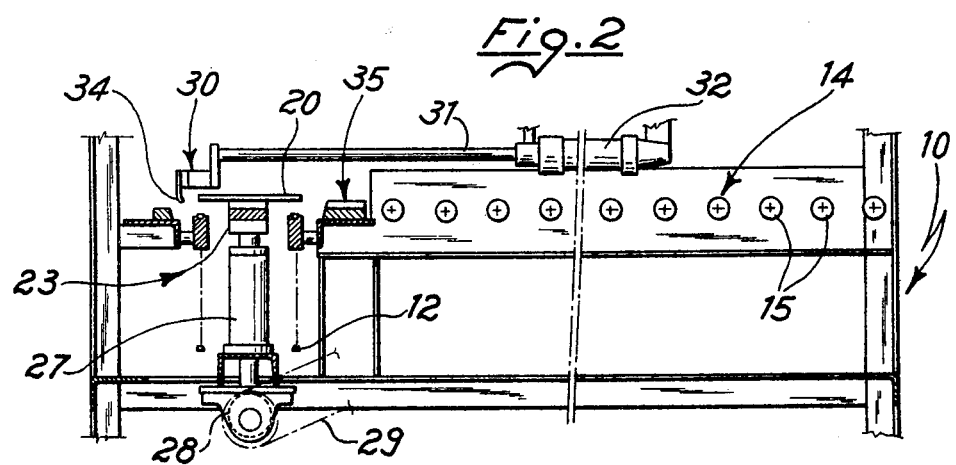

APPARATUS FOR LOADING OVENS FOR THE PRODUCTION OF TILES

BACKGROUND OF THE INVENTION

The present invention relates to a device for loading tiles into treatment and firing ovens, particularly ovens constituted by elongated processing chambers along which the tiles are caused to travel by supporting and forwarding devices, especially rollers. An oven of such a type has been described in copending application Ser. No. 835,013 filed on Sept. 20, 1977, now U.S. Pat. No. 4,154,576, to which reference is made purely for illustrative purposes but without intending to limit thereby the invention and its application to ovens such as described and claimed in such application of the same applicant.

Further, the invention is particularly applicable to ovens having a plurality of superimposed channels,—such as those described in the aforesaid and in other applications,—or possibly having channels set side by side or superimposed and side-by-side channels. But since the tiles travel independently in each of the channels and must be independently loaded into each one of them, the apparatus and devices according to the invention will be described essentially with reference to a single tile treatment and firing channel or plane, it being clear that they may be repeated for any number of treatment and firing channels or planes or chambers.

SUMMARY OF THE INVENTION

The apparatus which forms an object of the invention is characterized in that it comprises, in combination with each tile treatment and firing chamber along which the tiles travel parallel to the longitudinal axis of the chamber with a linear processing speed, a device for feeding the tiles, means for forming in such device a file of tiles to be concurrently loaded into the oven, means for taking up from such feeding device the tile file, and means for forwarding the tiles in the direction of the oven and for transferring the tiles onto a terminal conveyor which conveys the tiles all the way to the oven inlet and introduces them thereinto.

According to a preferred characteristic of the invention, the means for taking up the tile file from the feeding device are constituted by a support member which is vertically displaceable from a lower to a higher position and adapted to engage the tiles at the bottom thereof and to raise them above the feeding device during its passage from the lower to the higher position.

According to another preferred characteristic of the invention, the means for taking up the tiles from the feeding device and forwarding them in the direction of the oven comprises a thruster element which is actuatable parallel to the direction of loading which corresponds to the direction of the travel of the tiles in the oven, and which is adapted to engage the file of tiles which has formed on the feeding device and which has passed therefrom onto the take-up device and to forward it in the direction of the oven.

According to another preferred characteristic of the invention, the apparatus is provided with a static support device which is, adapted to receive the tile file engaged by the aforesaid thruster and to contribute to support the tiles in an intermediate phase of their forward displacement towards the terminal conveyor which conveys the tiles to the oven inlet.

According to another preferred characteristic of the invention, the terminal conveyor device is constituted by a plurality of rollers having their axes perpendicular to the direction of travel of the tiles and actuated to advance the tiles at the same speed and in the same direction which they have inside the oven.

According to a further preferred characteristic of the invention, the feeding device is constituted by two belts so spaced as to support the tiles at their two sides and to leave therebetween a gap sufficient for the passage of the take-up device which moves the tiles by raising them and disengaging them from the belts.

According to a further preferred characteristic of the invention, the upward motion of the take-up member for taking up the tiles and its subsequent return to the lowermost position, and the motion of the thruster in the direction of the oven for causing the tiles to pass from the take-up member to the static support device and to the terminal conveyor device, and its subsequent return to the inactive position, are controlled by a photoelectric cell which detects the stoppage of the last tile of the tile file to be loaded, when the file is complete.

According to a further preferred characteristic of the invention, the aforesaid motions are so synchronized that the motions of the take-up member and of the thruster element are sufficiently fast to allow an uninterrupted motion of the feeding device, so that the tile take-up operation and the displacement of the tiles beyond the take-up device and the return of the take-up device and of the thruster to their inactive positions, occur within a time interval that is sufficiently short so as not to interfere with the continuous feed of the tiles onto the feeding device.

BRIEF DESCRIPTION OF THE DRAWINGS

The invention will be better understood from the following illustrative and not limitative embodiment, with reference to the attached drawings, wherein:

FIG. 1 illustrates in horizontal cross-section a loading device according to the invention, applied to one plane of an oven;

FIG. 2 illustrates the device of FIG. 1 in vertical cross-section taken on plane II—II of FIG. 1;

DETAILED DESCRIPTION OF THE INVENTION

With reference to the attached drawings, numeral 10 designates a general frame of the loading device which may have any suitable structure and of which only the part relative to a generic intermediate plane of a multiple plane oven is shown—it being clear that nothing would change if the plane shown were the uppermost or the lowermost or even the only plane.

Figure 4:
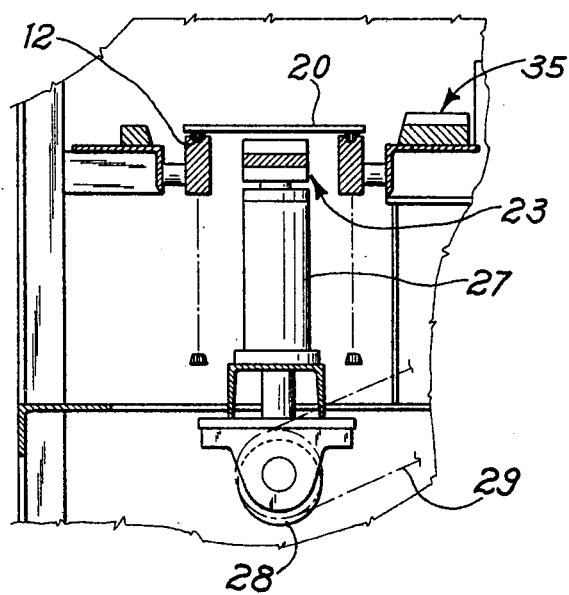
FIG. 4 is a detail of FIG. 2 on an enlarged scale, showing the take-up member in its lowered position.

The tiles are conveyed by the belts 12 which constitute the feeding device 11 and which are driven by pulleys 22 which are conveniently actuated, until the tiles reach the zone in which a take-up member is located, such member being constituted by the bed generally indicated at 23 which is mobile alternately from an inactive lower position illustrated in FIG. 4 to a higher takeup position shown in FIG. 2. During the feeding of the tile, the bed 23 is in the lowered position and consequently the tiles 20 forwarded by the belts 12 can slide therealong all the way to a position in which the first tile is stopped by the stop member 19, which is indicated in FIG. 1 and which is omitted for reasons of simplicity of illustration in the other figures.

The bed 23 comprises a plurality of alternating projections 25 and recesses 26, which need not necessarily have all the same width, the function whereof will be understood later on, and it bears on a support 27 through which it may be displaced upwards and downwards by a cam 28 actuated by means not illustrated in the drawings but symbolized by an interrupted transmission belt 29. When the bed 23 is in its lowermost position, the tiles which arrive are above the level of the upper surface of the projections 25 and therefore may slide, while being guided by the belts 12 until they are stopped by the stop member 19. A photoelectric cell 18 is located at a convenient position above the bed and is adapted to monitor the passage of the tiles, cell 18 being preferably a cell which operates by reflection within a suitable distance range.

As long as the tiles travel regularly forwards and therefore the photocell monitors their passing in a short predetermined time period, on the order of tenths of a second, the photocell does not send any signal to the mechanisms. When a file of tiles has formed against the stop member 19 and therefore a condition has been reached in which the introduction of the tile file into the oven may begin, the last tile stops below the photocell, the photocell receives the optical signal for a period of time greater than the predetermined one and reacts by ordering the start of the cycle that will be described, by means of conventional electrical means which a person skilled in the art can easily design and which therefore need not be described herein.

Figure 3:
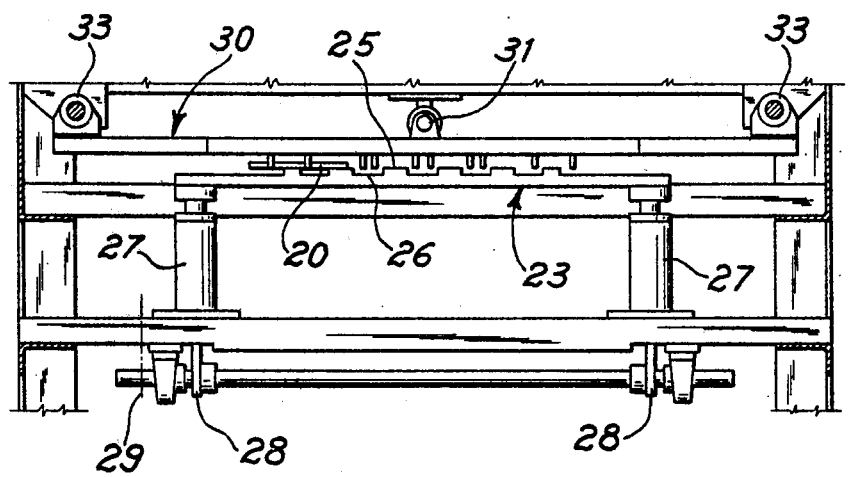
FIG. 3 illustrates the same device in a vertical cross-section perpendicular to that of FIG. 2 and taken on plane III—III of FIG. 1.

When the cell gives such order, the bed 23 is actuated by the cam 28 through the support 27 and rises to the take-up position shown in FIG. 2 and consequently lifts the tiles and disengages them from the belts 12. When the bed has reached the highest desired position, a thruster generally indicated at 30 is actuated to move in the direction of the oven. The thruster is carried by a rod 31 actuated in any desired way, e.g. by a hydraulic or pneumatic cylinder 32, and slides laterally on guides 33 (FIG. 3) and carries, as the active portion, hooked fingers 34 which are arranged in such a way that they may pass in the recesses 26 of the bed 23 without interfering with the projections 25 thereof. In this manner the fingers 34 of the thruster 30 engage the tiles and thrust them towards the oven, i.e. to the right as shown in FIGS. 1 or 2. Thus the tiles are transferred onto a support device constituted by the fixed bed generally indicated at 35 and which is constituted in a manner analogous to the bed 23, is correspondingly provided with projections and recesses, but is static and always remains at the level shown in FIG. 2, i.e. at the level at which it is adapted to receive the tiles and to contribute in supporting them in their passage from bed 23 to the terminal conveyor hereinafter to be discussed. As soon as the tiles rest on bed 35 and are in at least an initial engagement with the terminal conveyor, the bed 23 may move back downwards to the position shown in FIG. 4. Meanwhile the belts 12 have not ceased their motion and have continued to feed tiles. Concurrently the thruster 30 has returned to its inactive position. The device is so synchronized, however, that the interval between two tiles is sufficient to allow the entire cycle hereinbefore described of upwardly and downwardly motions of the bed 23 and to and fro motions of the thruster 30 to be completed in the interval between the arrival of a tile and the arrival of the next one, so that when the bed and the thruster have returned to their inactive positions, the first tile of a new group arrives and the operation begins once more.

Meanwhile, the tiles 20 have passed to the terminal conveyor 14, constituted by rollers 15 having a cylindrical or,—at least some of them,—grooved surface, actuated to move the tiles forward in the direction of the arrow 17 towards the oven inlet, which is located immediately downstream (to the right as shown in FIG. 1) of the described apparatus, and preferably at the same speed of travel which the tiles will have in the oven.

It is to be noted that preferably a given apparatus is adapted to load tiles of different dimensions, and to this end the projections 25 and the recesses 26 of the bed 23 and of the static support device 35, which are not equal to one another as seen in the figures, are suitably calculated to permit such operational flexibility. The precise dimensions may be easily determined in each instance by a person skilled in the art, and if needed, the corresponding different strokes of the bed can also be determined and carried into practice by means easily available to such a person.

An illustrative and not limitative embodiment has been described and the invention can be carried into practice by persons skilled in the art with many variations and adaptations.

I claim:

1. A loading apparatus for loading tiles to be fired into each tile treatment and/or firing chamber of an oven, wherein the tiles travel parallel to the longitudinal axis of a chamber at a linear processing speed, said apparatus comprising:

spaced belt means for feeding tiles to be fired in a direction perpendicular to said longitudinal axis;

stop means positioned adjacent said belt means for stopping the progress of said tiles in said direction and for forming said tiles into a file on said belt means;

vertically movable support means, vertically displaceable between a lowermost position and an uppermost position, for, during movement from said lowermost to said uppermost positions thereof, engaging undersides of said tiles of said file of tiles and for lifting said file of tiles above the level of said belt means, said support means comprising a movable support member having extending upwardly from an upper portion thereof projections separated and defined by recesses forming free transverse passages extending across said movable support member and parallel to said longitudinal axis, said projections having upper surfaces adapted to engage said undersides of said tiles;

conveyor means, positioned adjacent said belt means and said movable support means, for conveying said file of tiles in a direction parallel to said longitudinal axis to the chamber, said conveyor means comprising a plurality of rollers having axes extending perpendicular to said longitudinal axis; and means for removing said file of tiles from said movable support member and for transferring the thus removed file of tiles to said conveyor means, said removing means comprising a thruster member mounted for horizontal displacement in directions parallel to said longitudinal axis, said thruster member including a plurality of fingers for engaging sides of said tiles of said file of tiles, said fingers being positioned and dimensioned such that when said movable support member is in said uppermost position thereof said fingers register with said free passages of said movable support member and contact said sides of said tiles over substantially the entire thickness of said tiles.

2. An apparatus as claimed in claim 1, wherein said fingers extend vertically downwardly to a level below said upper surfaces of said projections when said movable support member is in said uppermost position thereof, and said fingers each have a lower hooked end, whereby said fingers engage said sides of said tiles over the entire thickness thereof.

3. An apparatus as claimed in claim 1, further comprising a stationary support member located adjacent said rollers of said conveyor means at a fixed level aligned with said upper surfaces of said projections when said movable support member is in said uppermost position thereof, said stationary support member having an upper portion including projections and free transverse passages registering with said projections and free transverse passages, respectively, of said movable support member when said movable support member is in said uppermost position thereof, and said projections of said stationary support member having horizontal upper surfaces adapted to support said tiles during movement thereof by said thruster member from said movable support member to said rollers of said conveyor means.

4. An apparatus as claimed in claim 1, further comprising photoelectric means, located at a position corresponding to the position of the last said tile of said file of tiles, for initiating and controlling the upward and downward motion of said removing means, and the motion of said thruster member toward and away from the oven only upon the detection of the stopping of movement of said last tile of said file of tiles, when said file of tiles has been completely formed, as a function of the presence of said last tile at said position thereof for a period of time substantially higher than that required for a moving tile to move through said position.

5. An apparatus as claimed in claim 1, wherein each cycle including an upward and a downward motion of said movable support member and a loading and a return motion of said thruster member takes place in a period of time shorter than the interval between the arrival of two successive said tiles on said belt means, and wherein said belt means operate continuously to feed said tiles in said direction perpendicular to said longitudinal axis.

* * * * *

UNITED STATES PATENT AND TRADEMARK OFFICE
CERTIFICATE OF CORRECTION

PATENT NO. : 4,227,847
DATED : October 14, 1980.
INVENTOR(S) : Renato Bossetti

It is certified that error appears in the above-identified patent and that said Letters Patent are hereby corrected as shown below:

On The Title Page, section [73] change the name of the assignee from "Società Impianti Termoelettrici Industriali (s.a.s.)" to --S.I.T.I. Società Impianti Termoelettrici Industriali (s.a.s.)--.

Signed and Sealed this

Twelfth Day of May 1981

[SEAL]

*Attest:*

RENE D. TEGTMEYER

*Attesting Officer*     *Acting Commissioner of Patents and Trademarks*